F. GOFF.
AIR BRAKE.
APPLICATION FILED JUNE 26, 1911.

1,042,666.

Patented Oct. 29, 1912.

Witnesses

Frank Goff,
Inventor by
Attorneys

UNITED STATES PATENT OFFICE.

FRANK GOFF, OF CAMDEN, NEW JERSEY.

AIR-BRAKE.

1,042,666.

Specification of Letters Patent.   Patented Oct. 29, 1912.

Application filed June 26, 1911.  Serial No. 635,826.

*To all whom it may concern:*

Be it known that I, FRANK GOFF, a citizen of the United States, residing at Camden, in the county of Camden and State of New Jersey, have invented a new and useful Air-Brake, of which the following is a specification.

This invention relates to an improvement in an air brake and signal system, the primary object of the invention being the provision of an air brake system provided with a pneumatic and electric control, whereby the brake may be controlled either electrically or pneumatically.

A further object of this invention is the provision of a combined auxiliary reservoir and brake cylinder, and valves mounted therein whereby the said brake cylinder is controlled by either a pneumatic mechanism or electrical mechanism, for setting the emergency brake.

A further object of this invention is the provision of an air brake system, controlled either by electrically operated means or pneumatically operated means, and provided with emergency mechanism whereby should the train become severed, the severed or rear portion will be automatically controlled, and the forward portion will be under the manual control of the engine man, whereby the forward portion of the train may proceed a safe distance ahead of the separated portion lessening the danger of a rear end collision, the engine man being notified by a signaling device of the severing of said train.

A still further object of this invention is the provision of an electro-pneumatic brake and signal system, whereby the various sections of the train, or cars, are provided with individual electrical controls whereby the complete train may be brought to a stop, whereby all of the brake cylinders are placed under the control of the engine man by a pneumatic or electrically operated means, thus providing a means or mechanism whereby should the electrical means fail, the pneumatic means will be at hand, and vice versa.

A still further object of this invention is the provision of a construction of combined auxiliary reservoir and brake cylinder, whereby the said brake cylinder is controlled through the action of an emergency valve and this is located in the auxiliary cylinder, or tank, and so disposed to be either operated electrically from a distant point or pneumatically.

A still further object of this invention is the provision for recharging the auxiliary reservoir while the brakes are set, through a non-return inlet pipe as will presently appear.

A still further object of the present invention is the provision for graduating the application or release of the brake through a combination valve as will presently appear.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Referring to the drawings, the numeral 1 designates the train pipe of an air brake system, which is operated in the usual manner, and supplied in the usual manner, and leading therefrom is the check valved non-return inlet pipe 3, which leads to the main casing or reservoir 4, which is divided by means of the diaphragm or partition 5 into an auxiliary reservoir compartment 6 and the brake cylinder compartment 7.

The diaphragm or partition 5 is provided with an aperture having the valve seat 8, which is adapted to be normally closed by the emergency valve 9 carried by the stem 10 having mounted thereon the coiled spring 10' between the valve 9 and the supporting or guiding spider 11 mounted within the chamber 6 of the reservoir, while at the other end of said stem 10 is mounted the emergency check valve operating piston 12. By this means, the piston 12 in the chamber 6 is normally disposed so as to divide the chamber into two compartments, the pressure upon each side of said piston being equalized as and for the purpose as will presently appear.

Leading from the application conduit or pipe 1, is a conduit or pipe 13, leading to the valve seat portion 14 into the emergency chamber 15, whereby the air is permitted to flow from the pipe 1 through the pipe 13 into the chamber 15 and upon the right hand side of the piston 12, thus equalizing with the pressure admitted through the non-return inlet check valve pipe 3, the pressure upon both sides of said piston 12. At the opposite end of the emergency chamber 15 is provided a valved controlled outlet 16, controlled by the disk valve 17, carried upon the armature 18 and normally closed by means of the spring 18′, the electromagnet or solenoid 19, controlling the actuation of the valve 17, to open the exhaust opening, for a purpose as will be hereinafter described. Mounted between the inner end of the plunger 18, and the plunger 22, is a plate or armature 20, and within the chamber 15 is also mounted the electromagnet 23, which controls the said stem 22 and its valve 21, said valve 21 being in position to seat upon the valve seat 14 and thereby close admission of air through the pipe 13 into the emergency chamber 15, simultaneously with the opening of the valve 17. Both of these electromagnets 19 and 23 are operably connected to circuits in the cars carrying them, the caboose or rear car, and the locomotive, as will hereinafter appear.

By the use of two electromagnets in the emergency chamber, and by means of the movable armature or plate 20, it will be seen that by the actuation of the magnet 19, its solenoid or plunger 18 will operate the said armature or plate 20 and consequently operate the valve 21, but it is so provided that should the electromagnet 23 be operated, it does not necessarily operate the valve 17.

Figure 3:
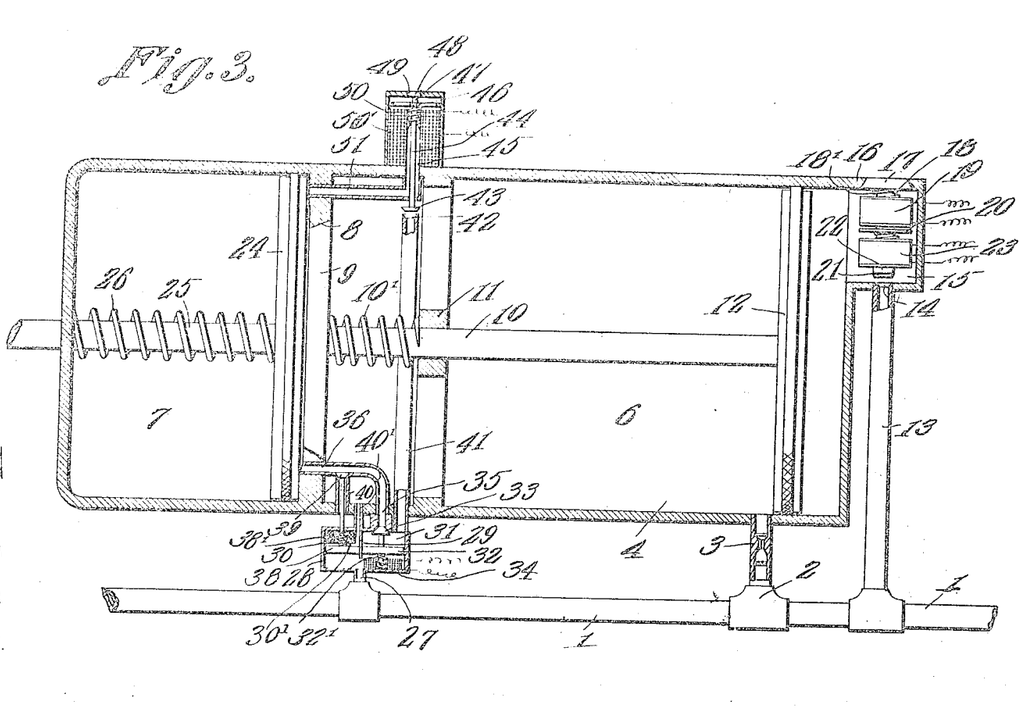
Fig. 3 is an enlarged detail longitudinal sectional view thereof, the parts being in normal position.
Figure 4:
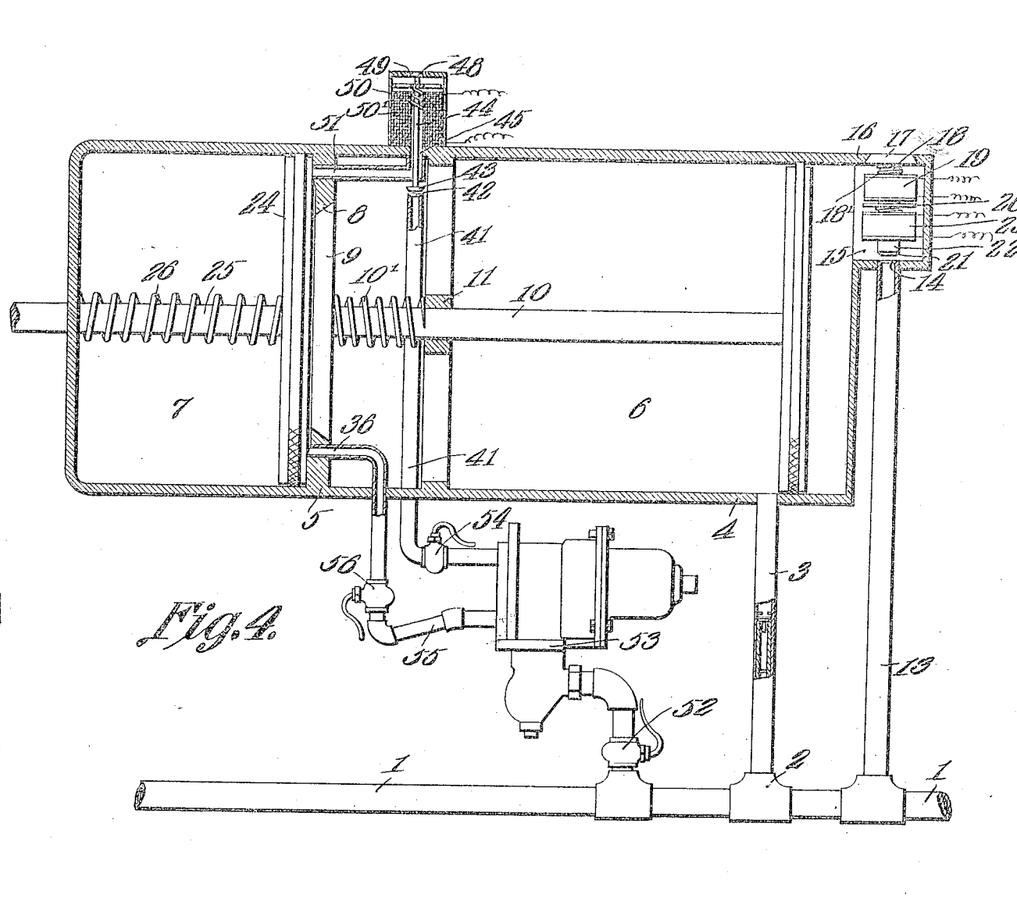
Fig. 4 is a similar view employing a triple valve in combination with the combined auxiliary reservoir and brake cylinder.

Mounted for reciprocation in the brake cylinder 7, is the brake operating piston 24, carried upon the brake operating plunger or stem 25, which is normally held in the position as shown in Figs. 3 and 4 of the drawings by means of the coiled or helical spring 26 mounted upon said stem within the brake cylinder chamber. By this means the spring normally holds the brakes out of engagement with the wheels, the said brakes being set by the action of the air upon the partition side of the piston 24, as will hereinafter be fully set forth. This particular construction for operating the emergency brakes is clearly shown in Fig. 2, but in Fig. 3 it will be noted that what is termed as a combination valve is also employed for actuating the service brake. In this construction the pipe 27 is led from the application pipe 1, to chamber 28, which is divided by a partition 29 into parallel chambers 30 and 31, respectively. Leading from within the reservoir 6, is a pipe or conduit 41, whose outer end leads to the compartment 31 of the combination valve casing 28, the small and very much reduced in area pipe or conduit 40′ being in communication with the reservoir 6 and the compartment 30 of the combination valve. In the chamber 31, is a piston 32, carrying a valve 33 which controls the admission of the air from the pipe 41 and chamber 31 to the curved pipe 35, the end 36 of which passes through the partition 5 and admits air to act upon the inner face of the brake operating piston 24. The piston 32 is what is termed an application piston, and is controlled electrically by means of the application electromagnet 34, or pneumatically by reducing the train pipe pressure, the spring 32′ normally holding the valve 33 seated so that no air is permitted to flow into the conduit 35. Mounted for reciprocation in the chamber 30 is a piston 38, normally held outwardly by means of a spring 38′, so that its valve 39 will be seated upon the inner end of the exhaust pipe 40, which is in communication with the pipe 36 and the outside air, the purpose of which will presently appear. This piston 38 is what is termed a release piston, and is provided with a release magnet 30′, mounted in the chamber 30 as clearly illustrated in Fig. 3 of the drawings.

A combined release and check valve mechanism is disposed to control the upper ends of the conduit or pipe 41 and the angular pipe 51, and comprises a stem 44 carrying at its lower end the check valve 43. This stem 44 is mounted in the conduit 45 of the magnet or solenoid 50′, and has mounted upon its upper end the armature 46 which is actuated by means of the electromagnet 50′ to be pulled inwardly to cause the valve 43 to seat in the upper end 42 of the pipe 41 and thereby close the said pipe 41. A spring is mounted upon the stem 44 to normally exert an outward or upward pressure upon the rod 44 so as to retain the valve 43 in the position as shown in Fig. 3. A pipe or conduit 51 is mounted to establish communication through the conduit or bore 45 of the magnet 50′ and the chamber 7 upon the inner side of the piston 24, the casing 50 containing the electromagnet or solenoid 50′ being provided with a valve seated outlet 49 which is controlled by the valve 48 mounted upon the extreme end 47 of the stem 44. By this means when the valve 43 is in the position as shown in Fig. 3, the valve 48 is seated within the seat of the outlet 49 and thereby prevents any escape of the air from the chamber 7 through the casing 50. Upon the energization of the solenoid or magnet 50', the rod 44 is moved so that the valve 43 seats upon and seals the upper end of the conduit 41 and simultaneously unseats the valve 48 and thereby permits the escape of air from the chamber 7 through the conduit 51, conduit 45 of the electromagnet or solenoid 50' and finally out of the valve seated outlet 49. By this means the conduit 51 establishes communication, when the said valve 48 is released, for the escape of air from the rear of the piston 24 through the pipe 51 and the conduit 45, while the armature 46 is actuated by the energization of the solenoid or magnet 50'. The deënergization of the said solenoid or magnet 50' will permit the spring actuated stem or rod 44 to be moved upwardly opening the valve 43 and closing the valve 48.

In the construction as clearly shown in Fig. 4 of the drawings, the combination valve in this connection, is displaced by a triple valve 53, thus the valve inlet 52 leads to the usual triple valve 53 whose valved inlet 54 is connected with the conduit 41, while the conduit 55 and its valved connection 56 is connected to the curved conduit 36', which corresponds to the same conduit 36 in Fig. 3 of the drawings and is for the same purpose. In this case the control of the service brake is entirely under the triple valve 53, as is customary in air brake systems.

Figures 1, 2:
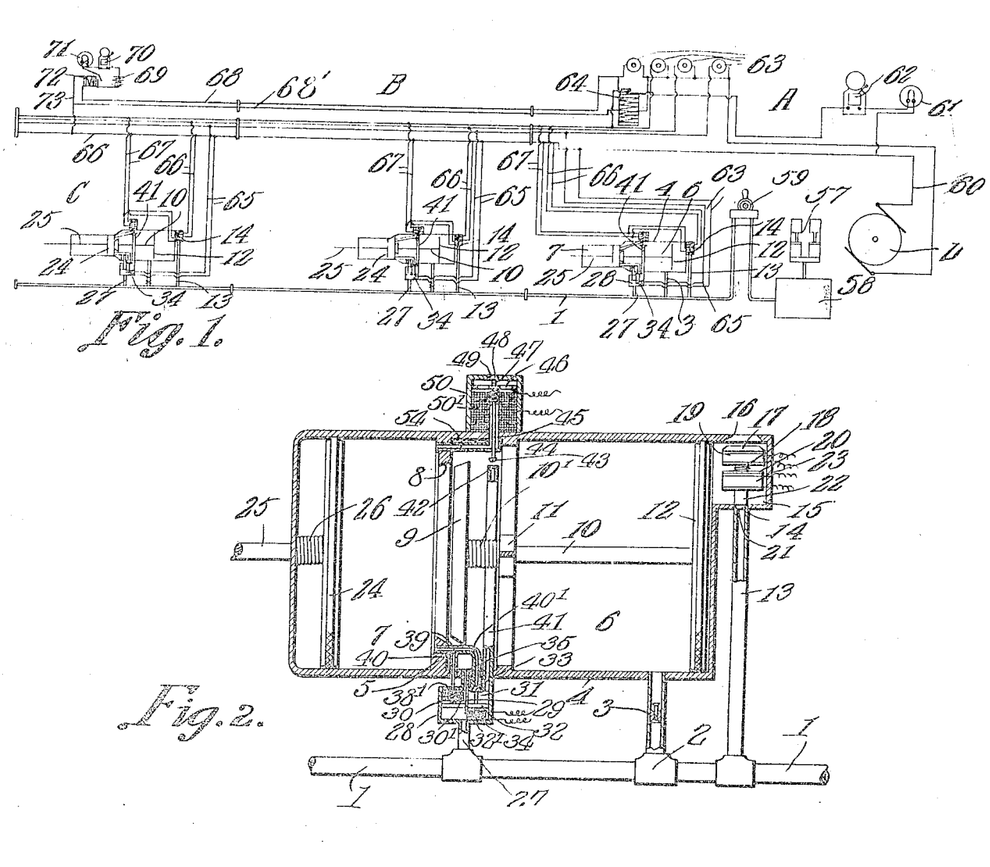
—Figure 1 is a diagrammatic view of the electro pneumatic train brake and signal system, as applied to the engine, intermediate cars, and the caboose of a freight train.
Fig. 2 is a detail longitudinal sectional view of the form of auxiliary tank and brake cylinder employed in connection with this system, the parts being in the position they assume when setting the brake.

In the diagrammatic view as shown in Fig. 1 of the drawings, there is a locomotive cab A, an intermediate car B, and a caboose C or rear car, this showing the diagram of the apparatus for use upon a train. In this instance a dynamo or other electrical source of energy D is employed and leading therefrom are the wires 60, which have connected therewith the visual signal 61, the alarm annunciator 62, and the push buttons or switches 63, the control magnet 64 being interposed within the said circuit and normally energized to hold the cab signal circuit open. By the manipulation of the push buttons 63 various mechanisms throughout the train, as heretofore set forth, are controlled by the engine man in the cab. The shunt circuit 65 is for the control of the combination valves 32 and 38 respectively; the shunt circuit 66 is for the control of the emergency valves 19 and 23 respectively, while the shunt circuit 67 is for the control of the combined release and check valves 43 and 48, respectively, said various mechanisms being located upon the locomotive, intermediate cars, and the caboose, as clearly illustrated in the diagram.

Carried in the caboose C, or the rear car of the train, is a circuit including the batteries 69, the audible alarm 70 and the visual signal 71 and the armature of the control magnet 72 which is normally opened. The magnet 72 is energized through the circuit including the main conductor wires 68 and 68' and leading throughout the length of the train and receiving current from the generator D. By this means the armature of the electromagnet or control magnet 72 during the proper coupling and running of the train will retain the circuit including the alarms 70 and 71 and batteries 69 open. It will thus be seen that should the conductors 68 and 68' be broken, due to the separation of the train, that the control electromagnet 72 will become deënergized, permitting its armature to move due to the action of the usual spring to close the circuit containing the batteries 69, and alarms 70 and 71, thus giving the alarms in the rear car or caboose and indicating that the train is parted. At the same time, the armature of the control magnet 64 on the locomotive, will close the battery circuit operating signals 61 and 62 respectively to indicate to the enginemen that the train has parted.

Mounted at the locomotive end of the train is the usual air pump 57, the air reservoir 58, and the manual control 59, which controls the admission of the air through the application pipe 1, all as clearly shown and illustrated in diagram in Fig. 1.

From the foregoing description it will be seen that the auxiliary reservoir 6 is supplied through the auxiliary reservoir supply pipe and non-return check valve 3 and the emergency chamber 15 is supplied through its pipe 13, thus equalizing air pressure on both sides of the emergency piston 12.

To apply the emergency brake pneumatically, the train pipe pressure is reduced, causing air to flow from the emergency chamber through the emergency supply pipe 13, and until the pressure is reduced below the tension of the emergency spring 10' of the emergency piston 12 and its valve 9, at which time the auxiliary reservoir pressure operates the piston 12 so as to unseat its valve and permitting the air to flow from the auxiliary reservoir to the brake cylinder, thus actuating the brake piston 24 and applying the brake, (not shown). When the pressure is increased the spring 10' will return the emergency valve and its piston to the position as clearly shown in Figs. 3 and 4 of the drawings, Fig. 2 showing the valve open and the air brake operated.

To apply the emergency brake electrically, the emergency magnet 19 is operated or energized through the operation of the switch in the locomotive, thus attracting from its seat the emergency chamber release valve 17, and simultaneously seating the emergency chamber check valve 21, whereby the emergency chamber 15 is quickly relieved of pressure and causes the quick or rapid movement of the emergency piston 12 and its valve 9, instantly and simultaneously delivering a maximum pressure to each brake cylinder regardless of the length of the train. At the same time the application air flows directly to the auxiliary reservoir 4 through the non-return check valve pipe 3, thus increasing the volume for delivering to the brake cylinder and bringing the train to a full stop in the shortest possible distance. After the emergency magnet 19 has been deënergized, its spring 18' will return the release valve 17 and the check valve 21 to its normal position, thus permitting the recharging of the emergency chamber and the equalization of the pressure within the auxiliary reservoir about the piston 12.

To apply the service brake pneumatically, train pipe pressure is reduced causing the air to flow from the pipe 27, while the auxiliary reservoir pressure forces the application piston 32 from normal position, unseating the application valve 33, and causing the auxiliary reservoir pressure to flow to the brake cylinder thus applying the brake, the spring 32' returning the piston 32 and the valve 33 to normal position as the pressure equalizes. Should the train part or separate while in motion, breaking the train pipe 1, the brakes will automatically apply upon the severed rear section, but will be automatically prevented from applying on the forward section, and thus permit the forward section to proceed a safe distance to avoid a collision.

The automatic application of the brakes upon the rear or severed section is due to the venting of the train pipe 1, and consequently the venting of the emergency chamber pressure, through the conduit 13. The pressure from below the piston 32 also vents through the pipe 1, and thus unseats the valve 33 opening the lower end of the conduit 41. Thus the pressure is released upon the right of the piston 12, and the opening of the valve 33, will permit the pressure within the chamber or auxiliary reservoir 6 to the left of the piston 12 to unseat the main valve 9 from the seat 8, thus permitting the air in the auxiliary reservoir 6, that has been retained therein by the non-return check valve 3 to enter the chamber 7 to the right of the piston 24 and thus push the same in opposition to the spring 26 and set the brakes. Simultaneously the air pressure from the reservoir 6 is conducted through the conduit 41, chamber 31 and conduit 36 to the chamber 7, thus providing two means for venting the chamber 6 to set the brakes upon the rear or severed section of the train.

The brakes upon the forward end of the train, due to the breaking or severing of the conductors 68 and 68' of the normally closed circuit, which includes the main control electromagnet 64 and the electromagnet 72 at the respective ends of the train, are held against automatic setting. As soon as the conductors 68 and 68' are severed, the main control electromagnet 64 is deënergized, and its armature 64' will be released to close the circuit including the electromagnets 28 and 50' upon all of the auxiliary reservoirs of the cars upon the forward end of the train. The energization of these electromagnets 28 and 50' will have the following effect. The electromagnet 28 will move the valve 21 upon its seat 14, stopping the pressure against escaping from the chamber at the right of the piston 12, as viewed in Fig. 3, while the electromagnet 50' will seat the valve 42 upon the seat 42, and thus prevent the escape of the air from the chamber 6 to the left of the piston 12. Thus the pressure will be retained within the auxiliary chamber 6 independently of the engineer's control. At the same time, the bell 62 and light 61, both of which are in the same circuit as the electromagnets 28 and 50' will be energized and notify the engineer that the train has parted. As the electromagnet 72 in the severed section of the train has become deënergized, its circuit including the bell 70 and light 71, and normally held open due to the energization of the electromagnet 72, will be energized and thus audibly and visually indicate to those in the end of the train that the train has parted. It will thus be seen that under normal conditions, the electromagnets 64 and 72 are energized, while the electromagnets 19, 28, 34, 38' and 50' are deënergized.

The electromagnet 34 is disposed to permit of the actuation of the brakes without bleeding the train pipe or the emergency chamber to the right of the piston 12, as one of the buttons 62 may be manipulated by the engineer to energize the electromagnets 34, which cause the unseating of the valves 33 on all cars simultaneously. The air will then pass from the chamber 6 through the conduit 41 into the chamber 31, and through the conduit 36 to the right of the piston 24 to set the brakes, and yet at the same time pressure is permitted to enter the chamber 6 through the non-return check valve 3, and thus provide additional pressure in case of any contingency. Should, however, it be desired to release the brakes electrically, air having been checked within the brake cylinder to the right of the piston 24, with the valve 9 seated, a button 63 controlling a circuit including the electromagnet 38', is closed. The energization of the electromagnet 38' will unseat the valve 39 and permit air to escape from the brake chamber at the right of the piston 24 through the conduits 36 and 39' to the outside.

To apply the service brake electrically, the service application magnet 34 is energized, attracting the application piston 32 and unseating its valve 33, thus discharging the auxiliary pressure to the brake cylinder. This movement is simultaneous regardless of the length of the train, and may be repeated as often as desired. By this means the train pipe pressure is free to flow direct to the auxiliary reservoir during this entire operation.

To release the brake pneumatically, the train pipe pressure is slightly increased, forcing the release piston 38 from normal position and unseating the release valve 39, causing the brake cylinder pressure to flow to the atmosphere through the exhaust pipe 40 for a short period, while the auxiliary pressure is equalizing through conduit 40' in the release chamber 30, sufficiently to adjust the spring 38' and reseating the release valve 39. This operation may be repeated as often as desired, causing perfect graduation of all the brakes. If so desired, to wholly release the brake with the first operation, the train pipe pressure is increased, to its fullest capacity, and thus unseating the release valve for a sufficient period to allow all of the pressure to escape from the brake cylinder, before the auxiliary reservoir pressure equalizes in the release chamber 30, the restricted port 40' preventing the quick equalization of the auxiliary pressure in the release chamber 30.

To release the brake electrically, the release magnets 30' are energized, causing simultaneous movement of all release valves throughout the entire train, graduating all brakes exactly the same, or releasing them promptly as desired. By this means trains of any length or speed may be brought to a period or rest with absolute safety and smoothness.

To operate the combination release and check valves, electrically, the same being energized and controlled at the engine end of the train, to release all the brakes gradually or otherwise, should the train part while in motion, the said valve is automatically energized by the control magnet 64, whereupon the check valve 43 closes the admission of air to the application chamber of the combination valve or triple valve if used, through the conduit 41, thus preventing the automatic application of the service brakes on the forward section of the broken train, but in no way interfering with the automatic application of the brakes on the rear train sections which are separated, at the same time the control magnet automatically warns the engine man that his train has parted, so that by the simple pressure of his finger upon the switch 63 the brakes upon the forward section of the train may be operated, after positive information that the rear section has come to a full stop, thus avoiding a possible rear end collision.

It is evident should the train part while in motion, that the electromagnet 23 will be automatically energized by the control magnet 64, this action attracting the armature 20, seating the check valve 21 and preventing the escape of air from the emergency chamber. This will prevent the automatic application of the emergency brake on the forward section of the broken train, just as the check valve 43 will prevent the automatic application of the service brake on the same section. The operation of the magnet 23 will in no way interfere with the operation of the magnet 19 although the operation of the magnet 19 will operate the valve 18 and consequently the valve 21.

What is claimed is:

1. The combination with a brake cylinder and auxiliary reservoir, of a train pipe communicating with the auxiliary reservoir, a piston controlled valve for controlling the admission of air from the auxiliary reservoir to the brake cylinder, an emergency chamber in communication with the auxiliary reservoir to equalize the pressure upon the piston, and electrically controlled valves in said emergency chamber for controlling the admission of air to the emergency chamber and the exhaustion thereof to permit the operation of the piston controlled valve.

2. The combination with an air brake system carried by a train, of means controlled thereby, comprising a brake cylinder and an auxiliary reservoir, said auxiliary reservoir being in communication with the train pipe of the air brake system, a piston controlled valve mounted within the auxiliary reservoir, for controlling the admission of air to the brake cylinder, an emergency chamber in communication with the auxiliary reservoir to equalize the pressure upon the piston, and electrically controlled valves in said emergency chamber for controlling the admission of air to the emergency chamber and the exhaustion thereof to permit the operation of the piston controlled valve.

3. The combination with an air brake system, having a series of combined auxiliary reservoirs and brake cylinders throughout its length, and a train pipe connected thereto, of an electrical control for the respective auxiliary reservoirs and brake cylinders, comprising electrically operated means to prevent the automatic application of the brakes upon the forward end of the train after an accidental separation of the train, and means at the forward end of the train controllable manually by the engineer for applying the brakes upon the forward end of the train.

4. The combination with an electrically controlled air brake system, of a combined auxiliary reservoir and brake cylinder, a valve for controlling the admission of air to the brake cylinder, a non-return application check valve conduit leading to the auxiliary reservoir from the train pipe in the air brake system, a normally open conduit leading from the reservoir, a casing in communication therewith, valves mounted therein and interposed between the train pipe of the air brake system and the auxiliary reservoir, and a conduit leading from said casing and the air brake cylinder to control the air brake without affecting the main valve of the auxiliary reservoir.

5. The combination with an electrically controlled air brake system, of a combined auxiliary reservoir and brake cylinder, a valve for controlling the admission of air to the brake cylinder, a non-return application check valve conduit leading to the auxiliary reservoir from the train pipe of the air brake system, a normally open conduit leading from the reservoir, a casing in communication therewith, valves mounted therein and interposed between the train pipe of the air brake system and the auxiliary reservoir, a conduit connecting said casing and the air brake cylinder to control the air brake without affecting the main valve of the auxiliary reservoir, and an electrically controlled release and check valve for controlling the conduit leading from the auxiliary reservoir to said casing.

6. The combination with an electrically controlled air brake system, of a combined auxiliary reservoir and brake cylinder, a valve for controlling the admission of air to the brake cylinder, a non-return application check valve conduit leading to the auxiliary reservoir from the train pipe in the air brake system, a normally open conduit leading from the reservoir, a casing in communication therewith, valves mounted therein and interposed between the train pipe of the air brake system and the auxiliary reservoir, a conduit connecting said casing and the air brake cylinder to control the air brake without affecting the main valve of the auxiliary reservoir, a conduit leading from the air brake cylinder to the outside air, and a combined release and check valve for controlling the conduit leading from the auxiliary reservoir to said casing and for controlling the conduit leading from the brake cylinder to the outside air.

7. The combination of an electrically controlled air brake system, of a combined auxiliary reservoir and brake cylinder, a valve for controlling the admission of air to the brake cylinder, a non-return application check valve conduit leading from the train pipe of the air brake system to the auxiliary reservoir, a normally open conduit leading from the interior of the auxiliary reservoir, a casing in communication therewith, electrically and spring actuated valves mounted in said casing, and a conduit leading from said casing to the brake cylinder.

8. The combination of an electrically controlled air brake system, of a combined auxiliary reservoir and brake cylinder, a valve for controlling the admission of air to the brake cylinder, a non-return application check valve conduit leading from the train pipe of the air brake system to the auxiliary reservoir, a normally open conduit leading from the interior of the auxiliary reservoir, a casing in communication therewith, electrically and spring actuated valves mounted in said casing, a conduit leading from said casing to the brake cylinder, and an electrically controlled check valve for controlling the said normally open conduit within the auxiliary reservoir.

9. The combination of an electrically controlled air brake system, of a combined auxiliary reservoir and brake cylinder, a valve for controlling the admission of air to the brake cylinder, a non-return application check valve conduit leading from the train pipe of the air brake system to the auxiliary reservoir, a normally open conduit leading from the interior of the auxiliary reservoir, a casing in communication therewith, electrically and spring actuated valves mounted in said casing, a conduit leading from said casing to the brake cylinder, a conduit leading from the brake cylinder to the outside air, and a combined release and check valve for controlling said normally opened conduit and for controlling the conduit leading from the brake cylinder to the outside air.

10. The combination with an electrically controlled air brake system, of a combined auxiliary reservoir and brake cylinder, a valve for controlling the admission of air to the brake cylinder, an emergency chamber in communication at one end with the auxiliary reservoir, said chamber being in communication with the train pipe of the air brake system and provided with an exhaust outlet, two individually operated valves mounted in said chamber for controlling the admission of air from the train pipe and the exhaust of air through the outlet, a check valved conduit leading from the train pipe to the auxiliary reservoir, a normally open conduit leading from the auxiliary reservoir, a combined application and release casing in communication with said conduit, two valves mounted therein for controlling the application and release respectively, and a conduit leading from one side of said casing to the brake cylinder.

11. The combination with an electrically controlled air brake system, of a combined auxiliary reservoir and brake cylinder, a valve for controlling the admission of air to the brake cylinder, an emergency chamber in communication at one end with the auxiliary reservoir, said chamber being in communication with the train pipe of the air brake system and provided with an exhaust outlet, two individually operated valves mounted in said chamber for controlling the admission of air from the train pipe and the exhaust of air through the outlet, a check valved conduit leading from the train pipe to the auxiliary reservoir, a normally open conduit leading from the auxiliary reservoir, a combined application and release casing in communication with said conduit, two valves mounted therein for controlling the application and release respectively, a conduit leading from one side of said casing to the brake cylinder, and a check valve for controlling the normally open conduit within the auxiliary reservoir.

12. The combination with an electrically controlled air brake system, of a combined auxiliary reservoir and brake cylinder, a valve for controlling the admission of air to the brake cylinder, an emergency chamber in communication at one end with the auxiliary reservoir, said chamber being in communication with the train pipe of the air brake system and provided with an exhaust outlet, two individually operated valves mounted in said chamber for controlling the admission of air from the train pipe and the exhaust of air through the outlet, a check valved conduit leading from the train pipe to the auxiliary reservoir, a normally opened conduit leading from the auxiliary reservoir, a combined application and release casing in communication with said conduit, two valves mounted in said casing for controlling the application and release, respectively, a normally closed conduit leading from one side of the said casing to the brake cylinder, a check valve to control said conduit, another conduit leading from the brake cylinder to the outside air, two oppositely disposed check valves mounted for movement in unison to control the conduit within the auxiliary reservoir and the last conduit leading from the brake cylinder, the valve for the last conduit being normally closed, and an electromagnetically actuated means for operating the two check valves to close the conduit within the auxiliary reservoir and to open the last conduit leading from the brake cylinder.

13. The combination with a pneumatic and electrical control, of an air brake mechanism, comprising a combined auxiliary reservoir and brake cylinder, a spring returned brake piston mounted in the brake cylinder, a spring closed valve mounted in the auxiliary reservoir for controlling the admission of air from the auxiliary reservoir to the brake cylinder, a piston for operating the same, a non-return check valved conduit leading from the train pipe of the air brake system and normally upon the inner side of the valve's piston, an emergency casing in communication with the auxiliary reservoir at the opposite end to the brake cylinder, said casing having an outlet thereto, an emergency conduit in communication with the train pipe of the air brake system and the emergency chamber, two electrically controlled valves, one for controlling the outlet of said chamber and the other for controlling the inlet of air thereto, and means whereby the opening of the outlet valve will operate to close the other valve.

14. The combination with a pneumatic and electrical control, of an air brake mechanism, comprising a combined auxiliary reservoir and brake cylinder, a spring returned brake piston mounted in the brake cylinder, a spring closed valve mounted in the auxiliary reservoir for controlling the admission of air from the auxiliary reservoir to the brake cylinder, a piston for operating the same, a non-return valved conduit leading from the train pipe of the air brake system and normally upon the inner side of the valve's piston, an emergency casing in communication with the auxiliary reservoir at the opposite end to the brake cylinder, said casing having an outlet therefrom, an emergency conduit communicating with the train pipe of the air brake system and the emergency chamber, two electrically controlled valves, one for controlling the outlet of said chamber and the other for controlling the inlet of air thereto, means whereby the opening of the outlet valve will close the other valve, a conduit leading from the auxiliary reservoir to the outside of the same, a two compartment casing having one compartment in communication with said conduit and the other compartment in communication through a restricted conduit to the auxiliary reservoir, a conduit leading from one of the compartments of said casing to the brake cylinder, a conduit leading from said last mentioned conduit to the outside air, a conduit leading from the train pipe of the air brake system to said casing, a valve mounted in one of the compartments of said casing for controlling the passage of air from the conduit within the auxiliary reservoir through the conduit into the brake cylinder, and a valve located in the other compartment of the casing for controlling the escape of air from the conduit leading to the brake cylinder to the outside air.

15. The combination with a pneumatic and electrical control, of an air brake mechanism comprising a combined auxiliary reservoir and brake cylinder, a spring returned brake piston mounted in the brake cylinder, a spring closed valve mounted in the auxiliary reservoir for controlling the admission of air from the auxiliary reservoir to the brake cylinder, a piston for operating the same, a non-return check valve conduit leading from the train pipe of the air brake system and normally upon the inner side of the valve's piston, an emergency casing in communication with the auxiliary reservoir at the opposite end to the brake cylinder, said casing having an outlet therefrom, an emergency conduit in communication with the train pipe of the air brake system and the emergency chamber, two electrically controlled valves, one for controlling the outlet of said chamber and the other for controlling the inlet of air thereto, means whereby the opening of the outlet valve will close the other valve, a normally open conduit within and leading from the auxiliary reservoir to the outside of the same, a two compartment casing having one compartment in communication with said conduit and the other compartment in communication through a restricted normally open conduit to the auxiliary reservoir, a conduit leading from one of the compartments of said casing to the brake cylinder, a conduit leading from the train pipe of the air brake system of said casing, a valve mounted in one of the compartments of said casing for controlling the passage of air from the conduit leading from the auxiliary reservoir through the conduit into the brake cylinder, and a conduit open to the outside air intersecting the conduit leading to the brake cylinder, and an electrically controlled valve mounted in the other compartment of the two compartment casing for controlling said last mentioned conduit.

16. The combination with a pneumatic and electric control, of an air brake mechanism comprising a combined auxiliary reservoir and brake cylinder, a spring returned brake piston mounted in the brake cylinder, a spring closed valve mounted in the auxiliary reservoir for controlling the admission of air from the auxiliary reservoir to the brake cylinder, a piston for operating the same, a non-return check valve conduit leading from the train pipe of the air brake system and normally upon the inner side of the valve's piston, an emergency casing in communication with the auxiliary reservoir at the opposite end to the brake cylinder, said casing having an outlet therefrom, an emergency conduit in communication with the train pipe of the air brake system and the emergency chamber, two electrically controlled valves, one for controlling the outlet of said chamber and the other for controlling the inlet of air thereto, means whereby the opening of the outlet valve will close the other valve, a normally open conduit within and leading from the auxiliary reservoir to the outside of the same, a two compartment casing having one compartment in communication with said conduit and the other compartment in communication through a restricted conduit with the auxiliary reservoir, a conduit leading from one of the compartments of said casing to the brake cylinder, a conduit leading from the train pipe of the air brake system, to said casing, a conduit in communication with the brake cylinder and with one compartment of the two compartment casing, a valve mounted in one of the compartments of said casing for controlling the passage of air from said normally opened conduit within the auxiliary reservoir through said last mentioned conduit into the brake cylinder, a valve located in the other compartment of the casing for controlling the escape of air from the conduit leading to the brake cylinder to the outside air, a conduit leading from the brake cylinder to the outside air, and a combined check and release valve for controlling said last mentioned conduit and the conduit leading from the auxiliary reservoir.

In testimony that I claim the foregoing as my own, I have hereto affixed my signature in the presence of two witnesses.

FRANK GOFF.

Witnesses:
  HENRY D. WARREN,
  WILLIAM W. GAUNT.